United States Patent
Jäger et al.

(10) Patent No.: US 6,814,687 B2
(45) Date of Patent: Nov. 9, 2004

(54) METHOD AND APPARATUS FOR CHANGING THE COMFORT LEVEL OF GEAR SHIFTS IN AN AUTOMATED TRANSMISSION OF A MOTOR VEHICLE

(75) Inventors: Thomas Jäger, Meckenbeuren (DE); Klaus Henneberger, Bühl (DE); Martin Vornehm, Bühl (DE); Klaus Küpper, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/402,248

(22) Filed: Mar. 27, 2003

(65) Prior Publication Data

US 2004/0014564 A1 Jan. 22, 2004

Related U.S. Application Data

(63) Continuation of application No. PCT/DE01/03218, filed on Aug. 20, 2001.

(30) Foreign Application Priority Data

Sep. 28, 2000 (GB) .......................... 100 47 984

(51) Int. Cl.⁷ .............................. B60K 41/02
(52) U.S. Cl. ............... 477/83; 477/77; 477/97; 477/902
(58) Field of Search .............. 477/77, 83, 84, 477/85, 90, 97, 902

(56) References Cited

U.S. PATENT DOCUMENTS

| | | | | |
|---|---|---|---|---|
| 4,314,340 A | * | 2/1982 | Miki et al. | ..... 701/62 |
| 5,152,192 A | | 10/1992 | Koenig et al. | |
| 5,434,779 A | | 7/1995 | Koenig et al. | |
| 5,778,329 A | | 7/1998 | Clausen et al. | |
| 6,468,182 B1 | * | 10/2002 | Brandt et al. | ..... 477/98 |
| 6,487,485 B1 | | 11/2002 | Henneken et al. | |
| 6,591,705 B1 | * | 7/2003 | Reik et al. | ..... 74/343 |

FOREIGN PATENT DOCUMENTS

| | | |
|---|---|---|
| DE | 198 49 062 | 4/2000 |
| JP | 07-329610 | * 12/1995 |

* cited by examiner

*Primary Examiner*—Ha Ho
(74) *Attorney, Agent, or Firm*—Darby & Darby

(57) ABSTRACT

The comfort level gear shift motor vehicle with an automated gear-shifting transmission is determined by shift parameters, which are dependent on driving parameters and on a shift program mode. The shift program mode identified through a characteristic parameter, which can vary a range of parameter values corresponding to a range of shift program modes. The method has the steps of detecting current values the driving parameters, detecting a current value of the characteristic parameter, determining respective minimum and maximum values that each of said shift parameters can assume within the range of characteristic parameter values as a function of the current driving parameter values, calculating actual shift parameter values as intermediate values between said maximum and minimum values for each of said shift parameters based on said current value of the characteristic parameter, and performing the gear shift with the actual shift parameter values.

18 Claims, 5 Drawing Sheets

Economy program

METHOD AND APPARATUS FOR CHANGING THE COMFORT LEVEL OF GEAR SHIFTS IN AN AUTOMATED TRANSMISSION OF A MOTOR VEHICLE

CROSS-REFERENCE TO RELATED APPLICATION

This application is a continuation of International Patent Application Serial No. PCT/DE 01/03218 filed Aug. 20, 2001, which is hereby incorporated by reference in its entirety.

BACKGROUND OF THE INVENTION

The invention relates to a method of varying the comfort level of gear shifts that are performed by an automated gear-shifting transmission. A set of shift parameters controlling the comfort level of gear shifts of the transmission is modified based on detected driving parameters characterizing a current traveling situation and based on a shift program mode. The shift program mode is either selected by the driver or automatically determined within a range of available shift program modes that are associated with a value range of a characteristic parameter. In determining the shift parameters as a function of the detected driving parameters, the transmission controller uses a functional correlation that depends on the current value of the characteristic parameter. In some systems, the current value of the characteristic parameter is determined on the basis of one or more of the detected driving parameters. The invention further relates to an apparatus that is operable to perform the inventive method. Also included in the scope of the invention is a method of monitoring the proper functioning of a controller device of an automated transmission.

The known state of the art offers gear-shifting transmissions for motor vehicles in numerous configurations. The term gear-shifting transmission in the conventional sense has been understood mostly to mean a manual transmission where the driver of the vehicle shifts gears by moving a manual shift lever within the constraints or tracks of a guide pattern, e.g., an H-pattern with a neutral selector track and engagement tracks for the individual gear ratios. In addition to these manually operated transmissions, some automated gear-shifting transmissions have already become known in which the movements along the selector track and the engagement tracks of the shift pattern are performed for example by actuators that are arranged on the gear-shifting transmission and are controlled by a program.

In automated transmissions of the foregoing description, a gear change is made by first taking the clutch of the vehicle out of engagement, shifting out of the currently engaged gear, shifting into the new gear, and re-engaging the clutch.

The automated gear-changing process should conform to the wishes of the driver in regard to the times at which the gear changes occur and also in regard to the level of driving comfort. The wishes of the driver may for example be determined through an evaluation of a current position of the gas pedal, e.g., whether the driver depresses the pedal lightly, whether the engine is running below idling speed, or whether the driver commands full power from the engine. In addition, the current traveling situation of the vehicle has to be taken into account for each gear shift, for example whether the vehicle is traveling uphill, or whether the engine is giving traction or running in an engine-brake mode.

The driver will expect the gear changes to run in a manner that meets his preferences. The gear-shifting process in an automatic transmission uses characteristic curves or functions for up-shifting and down-shifting. There are sets of characteristic curves corresponding to different driver-selectable programs for the control of the automatic transmission. The characteristic curves associated with the different gear ratios form a characteristic curve field or characteristic data array.

By offering a choice of control programs, the vehicle allows the driver to have an influence on the automatic shift process. With the so-called automated gear-shifting transmission (in the sense of the term that was defined above), there is the same need to take the driver's preferences into account in the gear shifting process. For example, the vehicle may have a sport-mode, i.e., a gear-shifting program that offers a sportier kind of shifts that take less time.

There may also be a winter mode for driving on a snow-covered road, in which case the entire gear-shifting process is performed gently, e.g., with a slow cutback of the engine torque before disengaging the clutch and an equally slow torque build-up after the shift has been completed. The vehicle may further have a manual mode where the driver can initiate a gear shift by operating a shift lever arranged inside the vehicle, or an economy mode for a fuel-saving way of driving, or a special mountain-driving mode. As these examples of shift-program modes illustrate, a vehicle can be equipped with a multitude of driving modes or shift program modes, as they are variously referred to, among which the driver may either make his own selection, or which may be automatically adopted by the transmission controller, e.g., after the on-board computer has detected the presence of mountainous road characteristics.

In addition to the aforementioned parameter that characterizes how fast the engine torque is lowered before disengaging the clutch and how fast the engine torque is restored to normal strength after the gear shift, there are a multitude of other parameters that have a significant influence on the transient phases of the power train during gear shifts and thus manifest themselves through the level of shifting comfort experienced by the driver. As a further example of such a parameter, one could mention the speed at which the clutch is disengaged before shifting out of the current gear and reengaged after the transmission has been shifted into the new gear.

The controller which directs the actuators for shifting the gears and for moving the clutch and which also controls the engine has to take a multitude of input parameters into account which are hereinafter referred to as driving parameters and include, e.g., the traveling speed of the vehicle, the engine rpm-rate, the current engine torque, and the currently engaged ratio, among others. Based on this input, the controller determines output parameters, hereinafter referred to as shift parameters, which include for example the force and speed of the shift actuation in the transmission, the speed at which the engine torque is cut back, the speed at which the clutch is disengaged and reengaged, and the speed at which the engine torque is restored after the new gear has been engaged.

The values that the controller can assign to the shift parameters are subject to certain constraints and limitations, because the power train of a vehicle represents a dynamic system that is capable of oscillating and has resonance frequencies. Thus, as an example, the shift parameter that determines the lowering and raising of the engine torque, or the parameter for the disengagement of the clutch, have certain ranges of values that must be avoided because they could cause resonances in the power train which would manifest themselves as a shaking of the vehicle, making gear shifts substantially less comfortable and possibly causing damage to the power train.

Based on the large number of possible driving programs or shift program modes and the driving parameters that have to be evaluated by the programs, such as e.g. the current gas-pedal depression and the currently engaged gear, there are a large number of characteristic curve fields or arrays that have to be optimized, so that the shift parameters as a function of the drive parameters will be determined in a manner that takes the engine characteristics as well as the driver's preferences into account. In the design of the transmission controller, it is therefore necessary to determine vehicle-specific shift profiles for the shift parameters and store them in the form of data arrays. Because the number of characteristic curve fields for automated gear-shift transmissions can exceed 15 and can even go higher in case additional adaptations have to be made by the transmission controller, the field of characteristic shift profiles will be represented by a very large data array which has to be determined and stored and which will have to be evaluated by the transmission controller during operation of the vehicle in order to achieve gear shifts that conform to the driver's wishes and the current traveling situation. Since the data-arrays would have to be adapted in a vehicle-specific manner, an inordinate amount of time and expense would be required to perform the adaptation.

OBJECT OF THE INVENTION

It is therefore the object of this invention to propose a less expensive and less complicated method of modifying the shift behavior of an automated gear-shifting transmission. In addition to the method, the invention aims to provide a device to perform the method. A further objective is to propose a method of monitoring the correct functioning of a controller device of an automated gear-shifting transmission.

SUMMARY OF THE INVENTION

The invention proposes a method of setting or changing the comfort level of gear shifts that are performed by an automated gear-shifting transmission. According to the method, a shift program mode is either selected or automatically determined among a plurality of shift program modes available in a transmission control device of the motor vehicle. The different shift program modes are distinguished by different values of a characteristic parameter. At the time when a gear shift is to be performed in the transmission, the method goes through the step of detecting the values of driving parameters that are characteristic of a current driving situation of the vehicle. Based on the detected driving parameter values, a next step of the method is to determine a set of shift parameter values controlling the shift behavior of the transmission. The shift parameters are functionally dependent on the detected driving parameters. To determine the shift parameter values, the method uses the inventive concept of determining minimum and maximum values that can be assumed by the shift parameters in the current driving situation, depending on the value of the characteristic parameter. Actual shift parameter values for the impending gear shift are then calculated as intermediate values between the minimum and maximum values, whereupon the gear shift is performed with the calculated actual shift parameter values.

What motivated the invention was the recognition that the gear-changing process in an automated gear-shifting transmission is influenced by a multitude of input parameters, referred to herein as driving parameters that depend on a current driving situation of the vehicle and/or are influenced by the driver of the vehicle. Based on the driving parameters, shift parameters controlling the comfort level of the shift process would have to be made available in the form of voluminous look-up tables to be accessed by a controller device. The values in the look-up table would have to be determined specifically for each vehicle model and for each gear ratio of the automated transmission in order to achieve a gear change that will be experienced as harmonious and consistent within itself.

The driving parameters include specific factors such as: a signal indicating that the vehicle is traveling through a curve; a signal indicating a shift program mode selected by the driver; a signal indicating the amount of gas-pedal depression; a signal indicating the currently engaged gear; a signal indicating that the vehicle is traveling uphill; a signal indicating whether the driver has selected an automatic or manual shift mode; and a signal characterizing the type of driver as sport-oriented or comfort-oriented or somewhere in between. The driver's preferred style can be determined, e.g., by monitoring the degree of pedal depression over some period of time.

The shift parameters, on the other hand, include for example: the speed at which the clutch should be taken out of engagement before a gear change so as to avoid a jolt in connection with the clutch disengagement; the rate at which the engine torque is cut back before the gear change so as to avoid a jolt from the torque decrease; the speed and force applied in actuating internal elements of the transmission during the synchronization process; the speed of moving the clutch back into engagement after the gear change; the speed of passing through the slipping phase at the gripping point of the clutch, and the rate of restoring the engine torque after the gear changing process.

The invention was motivated among other reasons by a desire to avoid the enormous effort that would have to be undertaken for each vehicle model and each gear ratio of the automated transmission to determine the tabulated arrays of shift parameter values in function of the driving parameter values. According to the invention, only the maximum and minimum values are determined and stored that the shift parameter values as functions of the driving parameter values can assume within the range of the aforementioned characteristic parameter. In subsequent actual operating situations of the vehicle, the driving parameters for a current driving situation of the vehicle are detected, and the applicable shift parameter values are calculated in real time as intermediate values between the aforementioned minimum and maximum values, rather than looking up the shift parameter values from a tabulated data array stored in a memory.

The values referred to as minimum and maximum values should be understood in a general sense as first and second values. It is not necessary for the first value to be a minimum and for the second value to be a maximum. The illustrated examples where the first value represents a minimum and the second value represents a maximum were chosen merely for the sake of clarity. As an example of a reverse correlation, if the time interval for the clutch disengagement were used instead of the speed of the clutch disengagement, the minimum speed would correlate to the maximum time interval and vice versa. For the determination of an intermediate value according to the invention, it is irrelevant which of the two end values represents the minimum and which represents the maximum.

The method further includes that each of the shift program modes that can be selected by the driver or determined by the transmission controller is associated with a characteristic parameter value. Based on the endpoints of the value range for the characteristic parameter, there is a maximum and a minimum for the values that a shift parameter can assume. In an actual shift situation, the transmission controller finds the maxima and minima of the shift parameter values based on the detected driving parameter. The actual shift parameters are then calculated as intermediate values depending on where the characteristic parameter value falls between the end points of the value range. The actual shift parameters are used to perform the shift process.

Thus, according to the invention, the data that have to be stored in memory as look-up tables consist only of the maximum and minimum boundary curves of the shift parameter fields corresponding to the endpoints of the characteristic parameter value range. In an actual driving situation, the applicable driving parameter values are determined as intermediate values between the maximum and minimum boundary curves. This eliminates the need to determine a multitude of characteristic fields and tabulate the data for each curve of each field as a look-up array for the transmission controller.

The invention proposes a further method of setting or changing the comfort level of gear shifts that are performed by an automated gear-shifting transmission using a shift program mode that is either selected or automatically determined among a plurality of shift program modes available in a transmission control device of the motor vehicle. At the time when a gear shift is to be performed in the transmission, the method goes through the step of detecting one or more driving parameter values that are characteristic of a current driving situation of the vehicle. A next step of the method is to determine a characteristic parameter value that is dependent on the detected driving parameter values. Minimum and maximum curves of shift values in function of driving values are stored for look-up based on the characteristic parameter value. The shift process is performed with shift values that are determined as intermediate values between the minimum and maximum shift parameter values at the abovementioned characteristic parameter value.

In accordance with the further method just described, a first step consists of detecting the current driving parameters and determining a current characteristic parameter value dependent on the detected driving parameters.

Dependent on the characteristic parameter value, minimum and maximum values are determined that can be assumed by the shift parameters in function of the driving parameters. Dependent on the current characteristic parameter value, intermediate values of the shift parameters are determined as intermediate values between the minimum and maximum values, and the shift process is performed with the shift parameters that are based on the current value of the characteristic parameter.

Under this embodiment of the inventive method, it is likewise unnecessary to store complete tabulated arrays of shift parameter fields in a memory of the transmission controller in order to cover every possible combination of driving parameters and driver preferences in order to perform all shift maneuvers in a manner that is appropriate for the driving situation. According to the invention, the data that have to be stored in memory for each characteristic parameter value as look-up tables consist only of the maximum and minimum boundary curves of the shift parameter fields in function of the driving parameters. In an actual driving situation, the applicable shift parameter values are determined as intermediate values dependent on the currently effective driving parameter values. The shift process is performed with the applicable shift parameter values in a manner that conforms to the driver's inputs as well as the actual driving situation.

In accordance with a further developed embodiment of either of the foregoing methods, the intermediate values are calculated by interpolation between the minimum and maximum values. The interpolation can be a conventional linear interpolation, but the scope of possibilities also includes non-linear forms of interpolation. It is also conceivable that for driving situations that occur infrequently, i.e., driving parameter values that are found only in rare cases, the current shift parameter values may be determined by an extrapolation going outside the interval between the previously determined minimum and maximum values.

In accordance with a further embodiment of the method, shift parameter values that would cause an oscillatory shaking of the vehicle during a gear-changing process are excluded from use in a gear shift.

The concept of excluding certain values or value ranges of shift parameters recognizes the fact that the power train of a vehicle is a dynamic system that is capable of oscillating at certain resonance frequencies and that the resonances can be excited by certain ways of performing a gear shift. Consequently, it is possible for a gear-shifting process to cause shaking oscillations of the vehicle which would be felt by the driver as uncomfortable or disharmonious. In addition, such shaking vibrations also involve the risk of damage to the power train. Therefore, when determining shift parameters in response to a current driving situation or to a driver command, the inventive method provides the concept of excluding shift parameter values that would cause an oscillatory shaking of the vehicle.

In accordance with a further concept of the invention, the shift parameters for initiating the gear shift process and the shift parameters for ending the gear shift process are determined in connection with each other in order to achieve a shift process that is consistent within itself.

This concept of the invention takes into account that the respective shift parameters for the beginning phase and the ending phase of a shift process, for example the respective rates of cutting back the engine torque before the gear change and restoring it again after the gear change, have to be matched to each other in order to achieve a shift that is consistent within itself. A self-consistent shift process is experienced by the driver as harmonious or well-matched. This is the case, for example, if the respective rates of cutting back and restoring the engine torque are in a ratio of about two to one, i.e., if the time interval for restoring the engine torque is about twice as long as the time interval for cutting back the engine torque.

In contrast, if the ratio between the aforementioned rates is significantly different from a ratio of two to one, e.g., if a very fast cutback were combined with a very slow restoration of the engine torque, the driver would find the fast cutback rate to correspond to a lively, sporty style of driving, while the slow torque restoration, in comparison, would give a sluggish impression, so that the gear shift would not be consistent within itself.

In addition to the rates of cutting back and restoring the engine torque, other shift parameters that strongly influence the transient properties of the shift process include in particular the speed and force applied to actuating the gear change in the transmission.

According to the invention, the detection of driving parameters includes parameters that depend on a current input from the driver as well as parameters that depend on a current traveling situation of the vehicle. Thus, the process of determining the shift parameters takes the driver's wishes as well as the actual traveling situation into account. In other words, the inventive method uses a driver-input detection and a traveling-situation detection as a basis for determining the shift parameters.

Shift parameters that are subject to change from one shift process to the next in response to varying driving parameters include in particular the speed at which the engine torque is cut back before the gear change, the speed at which the clutch is taken out of engagement, the speed and force applied by the actuators to change gears in the transmission, the speed of re-engaging the clutch, and the speed of building up the engine torque again after the gear change.

The scope of the invention also includes an apparatus for performing the method described above. This apparatus consists of or includes a processor unit that evaluates the driving parameters as well as the parameters of the shift program mode or shift mode that has been selected by the driver or automatically determined. The processor unit further looks up shift parameter values as well as a characteristic parameter value of the currently effective shift program mode in a memory device, or it calculates the characteristic parameter value on the basis of the driving parameters. Based on the detected driving parameters, the looked-up shift parameter values and the characteristic parameter, the device computes the actual shift parameters for performing the impending gear shift.

In other words, the processor unit evaluates the detected current driving parameter values and also detects or determines the driving program or shift program mode that is to be used for performing the impending gear shift of the automated transmission. The processor unit further has the capability to look up shift parameter values that are stored in a memory device as functions of driving parameter values in the form of look-up tables for the maximum and minimum shift parameter values associated with each driving parameter value. In addition, the device looks up a characteristic parameter that identifies the driving program or shift program mode and whose values for the different possible shift program modes are likewise stored in the memory device. Alternatively or in addition, the processor unit could have the capability to calculate the characteristic parameter value from current driving parameters. Based on the detected current driving parameters and the currently applicable characteristic parameter, the processor unit determines the shift parameter values that are to be used in the current gear-shifting process. The driving parameters or input parameters may also include a driver input, for example in the form of a signal that indicates the current degree of gas-pedal depression.

Based on the calculated shift parameters, the processor unit directs the shift process through some or all of the different phases, such as disengaging the clutch, shifting out of the currently engaged gear, shifting into the new gear, re-engaging the clutch, where the processor unit controls the time length of the respective phase and/or the force, torque or speed of the respective actuators, or other factors.

According to a further developed version of the invention, the apparatus also includes a device for detecting and/or evaluating error situations. The device has error counters whose count is incremented or decremented depending on the detected driving parameters. After a predetermined error count has been exceeded, a diagnostic message is given out and/or the re-engagement of the clutch is postponed until the error count has been reset in response to the driving parameters.

In short, the inventive apparatus is also configured with the capability to detect and evaluate error situations. To perform this function, the apparatus may be equipped with an error counter that is incremented dependent on the detected driving parameters, i.e., the count can be increased as well as decreased in response to the driving situation.

The limit or threshold for the error count that triggers an action, such as sending a diagnostic message or putting a hold on a clutch re-engagement until the error count has been reset, can likewise take on different values dependent on the detected driving parameter values. A reset of the error count is possible, e.g., in response to current driving parameter values indicating that the vehicle is standing still and that no gear is engaged. To provide the system with a redundant degree of safety, it is also possible to design the apparatus with two processor units of the foregoing description, where the processor units would have the capability to monitor each other.

The invention further includes a method of monitoring the correct functioning of the controller device of an automated gear-shifting transmission. The controller device has at least one error counter that can count up and/or down. The monitoring method includes the steps of incrementing the count at the occurrence of an error situation and decrementing the count when no error is detected, and initiating an action when the error count reaches a threshold value, wherein the increment and/or decrement is variable.

With the concept of varying the increment or decrement based on the driving situation of the vehicle with the automated transmission, the time interval for reaching the trigger limit and a subsequent action can be varied. For example, the action may be to reset the transmission controller when the trigger limit is reached. This procedure has the advantage that the restart of the controller prevents the control program from getting stuck in a faulty action or routine, because a faulty action is terminated and the controller returns on its own to a sound operating mode.

The error count threshold can also be varied depending on the driving situation of the vehicle. the trigger threshold may for example be raised when the vehicle is moving and lowered when the vehicle is standing still.

The action that is triggered by reaching the threshold can be variable dependent on the driving situation of the vehicle.

As an example of this concept, to avoid a potentially critical situation while the vehicle is standing still with a gear engaged, a movement of the clutch actuator to engage the clutch is stopped if the error-count limit has been reached, and the clutch engagement is released only after the error count has been decremented or the counter has been reset. It can be advantageous if the error count limit is lowered when the vehicle is standing still with a gear engaged, so that the trigger limit is reached sooner than when the vehicle is moving, because a critical situation such as the vehicle taking off on its own cannot occur while the vehicle is being driven by a driver, so that it is permissible to delay the point at which the error count limit would cause an action of the controller device.

Finally, the scope of the invention also includes the concept of providing two processors in the controller device, wherein at least one of the processors has an error counter and the processors mutually monitor each other.

BRIEF DESCRIPTION OF THE DRAWINGS

The following detailed description of the invention refers to the attached drawings, wherein.

DETAILED DESCRIPTION OF PREFERRED EMBODIMENTS

Figure 1:
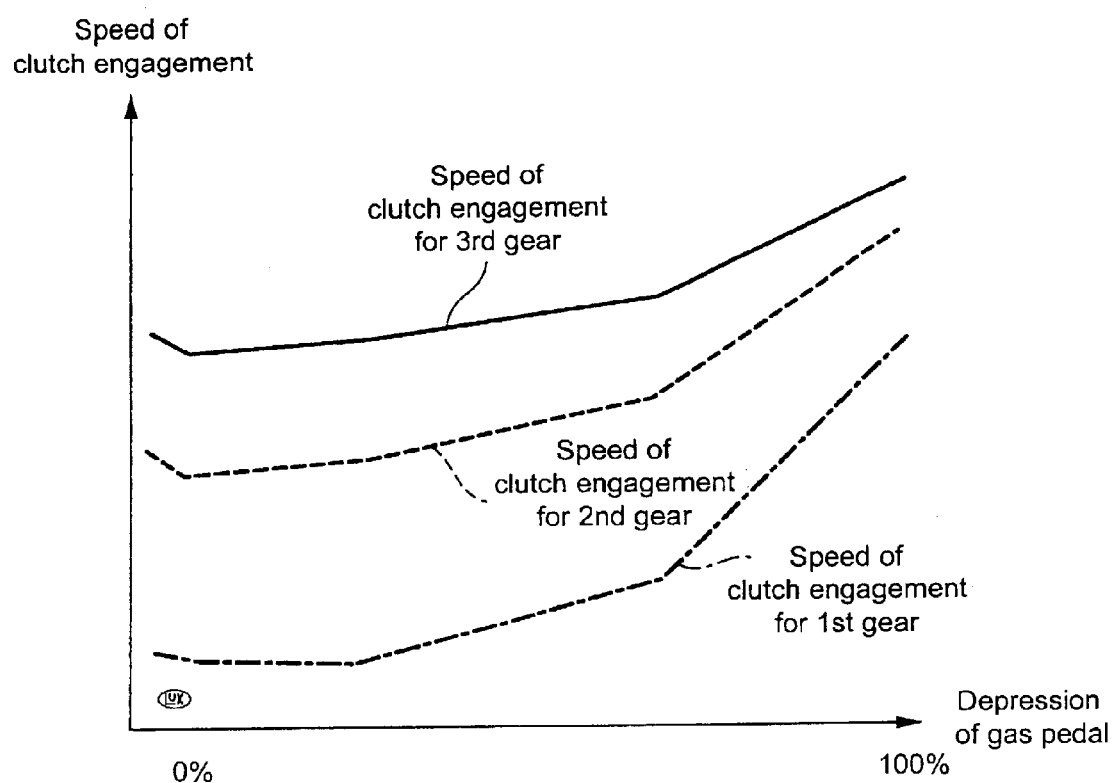
FIG. 1 represents a characteristic curve field for the speed of engaging the clutch as a function of which gear of the automated transmission is engaged and how far the gas pedal is depressed.

The graph of FIG. 1 shows a shift-parameter curve field. The speed of engaging the clutch in an automated transmission represents an example of a shift parameter, and the degree of gas-pedal depression represents an example of a driving parameter. The curves in the graph show the speed of clutch engagement as a function of gas-pedal depression for different gear levels of the transmission. For the sake of clarity, the characteristic curves are shown only for first, second and third gear. In an automated transmission with five gear levels, the characteristic curve field has five curves.

The speed of clutch engagement and the degree of pedal depression are only mentioned as examples of a shift parameter and a driving parameter, respectively, where the functional correlation in the form of gear-specific and vehicle-specific characteristic curves would have to be determined for the design of the control of an automated transmission. If the vehicle has several shift program modes, a specific characteristic curve field would be required for each shift program mode, where each field would be dependent on an associated driving parameter and/or a signal indicating a driver input. The curves have to be stored as data arrays with an appropriate step resolution between adjacent values of the input quantities "driving parameter" and/or "driver input". In a typical case this may require an array of 28672 values to represent the characteristic fields. This number of values would have to be determined and experimentally tested in the design stage of the transmission, an undertaking that would be impossible or at least unacceptably expensive and time-consuming to realize.

Without the benefit of the method and/or apparatus of the present invention, it would therefore be necessary to perform a gear-specific and vehicle-specific determination of a multitude of shift parameter fields as functions of a multitude of driving parameters. The number of characteristic curve fields would go even higher if the choice of different shift program modes is expanded.

The more precisely the transmission controller has to match the shift parameters to the driving situation and/or to the driver input, the greater will be the number of tabulated values that would have to be stored in a multi-dimensional data array and which would have to be determined through vehicle-specific tests and computations in the design of the transmission controller, so that the cost and effort required would reach unacceptable levels.

Figure 2:
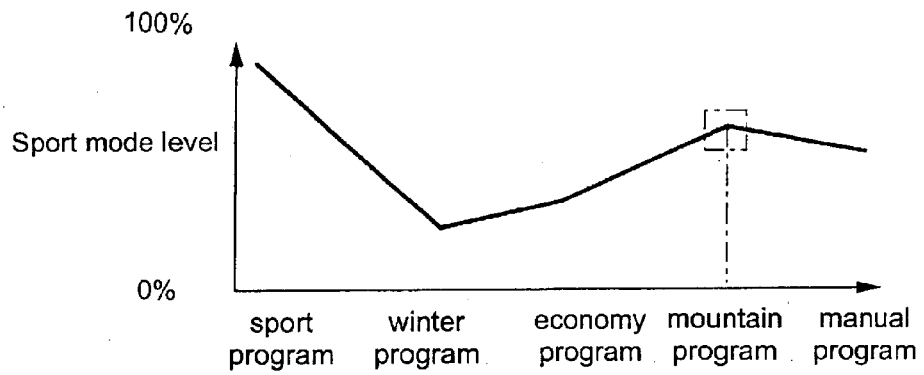
FIG. 2 shows a graph in which a characteristic parameter value is assigned to a selected or automatically determined shift program mode.

The graph of FIG. 2 illustrates the concept of a characteristic identifier for a selected or automatically determined shift program mode that directs the shift behavior of the automated transmission. Among available shift program modes, the driver can select a program through a selector lever arranged among the controls inside the vehicle, or the program is automatically set by the transmission controller, e.g., after an increasing slippage has been detected at the driven wheels, indicating a loss of friction between the pavement and the driven wheels, or in response to a measurement of the outside temperature, or in response to detecting frequent changes between uphill and downhill travel, and other relevant conditions.

Based on the foregoing description, it should be clear that the shift parameters that the transmission controller uses for shifting the transmission depend significantly on which of the available shift program modes has been selected by the driver or automatically set by an onboard computer or controller.

The present invention introduces the concept of assigning a characteristic parameter to each shift program mode and entering the characteristic parameter value into the computing process that determines the shift parameters. This parameter value, hereinafter referred to as sport mode level, can change while the vehicle is traveling either as a result of an active intervention by the driver or as a result of an automatic adaptation of the transmission controller. It was found advantageous to define the sport mode level as a percentage that can take on values from 0% to 100%.

The concept of the sport mode level has the advantage that it eliminates the need for a multitude of curve fields correlating shift parameters to driving parameters. Instead, it is sufficient to define one characteristic curve field for a sport mode level of 0% and a second characteristic curve field for a sport mode level of 100%. Values for the shift parameters at intermediate sport mode levels can be calculated as a function of the currently effective sport mode level, so that they will not have to be determined and stored as arrays of large numbers of data in the design process of the transmission controller. Instead of using tabulated look-up values, the transmission controller performs a real-time computation of the shift parameters consistent with current driving parameters and driver inputs. The shift parameters are determined, e.g., by linear interpolation, and the shift controller directs the shift process on the basis of the interpolated values.

Figure 3A:
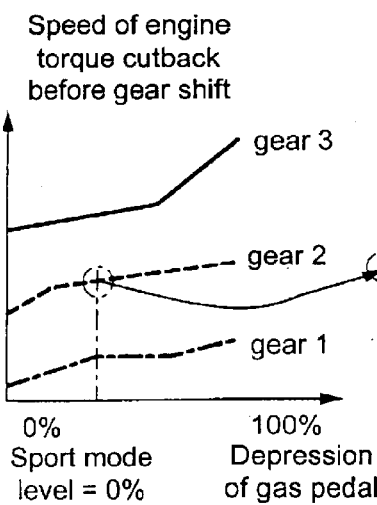
FIGS. 3a, 3b, 3c illustrate an embodiment of the inventive method.

In the graph of FIG. 3a, the shift parameter "speed of engine-torque cutback before gear shift" is plotted as a function of the driving parameter "gas pedal depression" for a sport mode level of 0%.

For the sake of clarity, the characteristic curves are shown only for first, second and third gear of an automated gear shift transmission. A trend can clearly be recognized for the speed of the engine-torque cutback to increase with a stronger depression of the gas pedal and also as a function of which gear is engaged in the transmission.

Figure 3C:
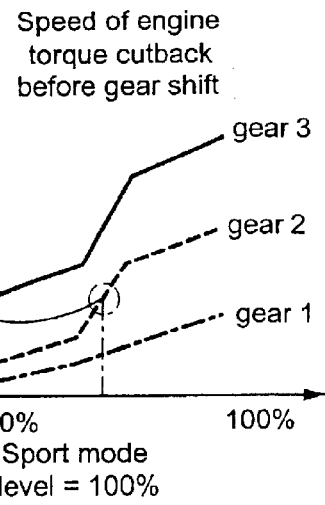
Figure 3B:
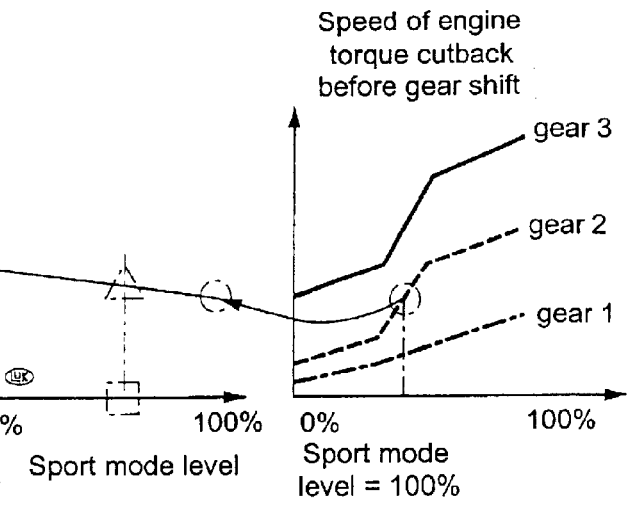

The graph of FIG. 3b is analogous to FIG. 3a, with the difference that the curves in FIG. 3b are applicable to a sport mode level of 100%. As is evident from comparing FIG. 3b to FIG. 3a, the curves for "speed of engine-torque cutback before gear shift" versus "gas pedal depression" have much steeper gradients for the sport mode level of 100% (FIG. 3b) than for the level of 0% (FIG. 3a). In other words, at a sport mode level of 100% the cut-back speed for the engine torque increases significantly faster with a stronger gas-pedal depression than at the level of 0%.

Conversely, one concludes that overall, the engine torque is cut back faster at a sport mode level of 100% than at a sport mode level of 0%, and that the speed of the torque cutback increases more steeply with a stronger gas-pedal depression at the 100% sport mode level than it increases at the 0% level.

The driver can influence the sport mode level percentage through the setting of the selector lever or also through his manner of driving if the transmission has an adaptive controller that detects whether the driver tends to run the engine at a high torque level or at a low torque level. It is also possible that the transmission controller automatically adjusts the sport mode level in response to currently prevailing driving parameters, so that a current sport mode level is determined as an intermediate value between 0% and 100% depending on a current driving situation and a currently effective driver input.

After the sport mode level has been determined in this manner, the transmission controller computes the shift parameters by interpolating between the shift parameter field for the 0% sport mode level and the shift parameter field for the 100% sport mode level.

The FIGS. 3a and 3b show only one example of a characteristic field of shift parameter values as a function of driving parameter values. Other shift parameters as functions of other driving parameters can likewise be determined for a sport mode level of 0% and a sport mode level of 100%, so that other current shift parameters can be determined in the same manner by interpolation between a sport mode level of 0% and a sport mode level of 100% which, as mentioned above, eliminates the need for storing intermediate values in look-up table arrays to be accessed by the transmission controller.

Based on the foregoing discussion, the inventive concept of the sport mode level as introduced above in the context of FIG. 2 will now be understood more clearly. The respective sport mode levels for different shift program modes are shown in the form of a graph. The sport mode level determines a driving program that can be driver selectable or it can be set by the transmission controller in response to a detected current driving situation. The current sport mode level is an intermediate value between a sport mode level of 0% and a sport mode level of 100%.

As a next step after the sport mode level has been determined, the controller finds the respective shift parameter values in the characteristic curve fields for the 0% sport mode level and the 100% sport mode level, as indicated by the small circles in FIGS. 3a and 3b. As a third step, the current shift parameter value (indicated by the small triangle in FIG. 3c) for the current sport mode level (indicated by the small in FIG. 3c) is found by interpolation between parameter values for the 0%- and 100% levels, as visualized in FIG. 3c.

After the current shift parameter value (small triangle in FIG. 3c) has been determined in this manner, it is used for the currently pending gear shifting process, i.e., the engine torque is cut back at the speed indicated by the current shift parameter value.

Figure 4A:
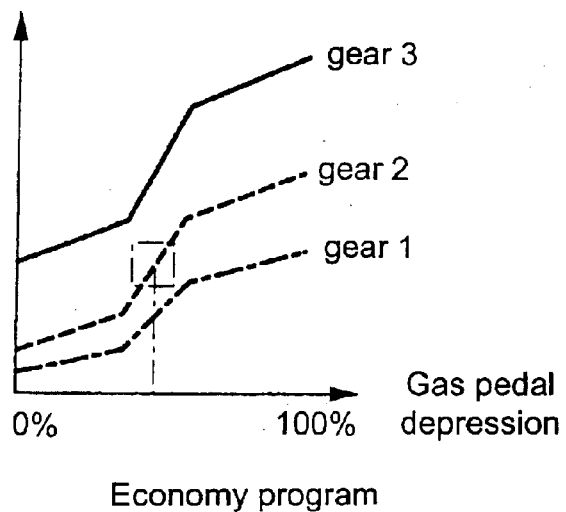
FIG. 4a and 4b illustrate a further embodiment of the inventive method.
Figure 4B:
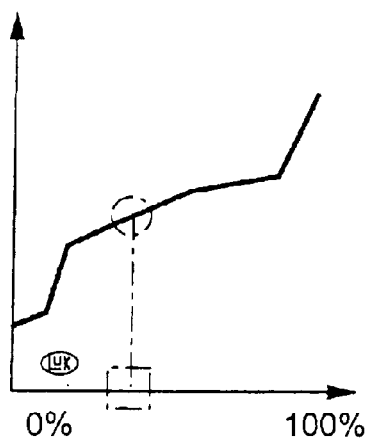

According to an embodiment of the inventive method, a currently applicable shift parameter can also be determined from a sport mode level that is derived from a driving parameter. The diagram in FIG. 4a illustrates a sport mode level that is a function of the driving parameter "gas pedal depression". A different curve applies to each gear of the transmission. For the sake of clarity, only the curves for first, second and third gear are shown. The characteristic curves of this graph represent a further characteristic curve field which determines the sport mode level to be used in a gear shift on the basis of the current gas pedal depression.

Based on the currently effective shift parameter field or the driving program, which can either be selected by the driver by setting the selector lever or determined by the transmission controller in response to the current driving situation, a sport mode level (small square in FIG. 4a) is selected as a function of the currently engaged gear and the current driving parameter value, i.e., the current gas pedal depression in the case of FIG. 4a.

As can be concluded directly from FIG. 4a, for example in the curve for second gear, the sport mode level with an only lightly depressed gas pedal is lower than with a strongly depressed pedal. Consequently, the rate at which the engine torque is cut back is slower when the gas pedal is only lightly depressed than when it is strongly depressed. Thus, if the automated transmission shifts from second to third gear and the gas pedal is depressed only lightly, the engine torque is cut back more slowly than in a case where the same gear shift is performed with a strong depression of the gas pedal, so that the shift process runs with a higher sport mode level, i.e., faster and thus in a more sportive manner than with a light depression of the gas pedal.

Figure 5:
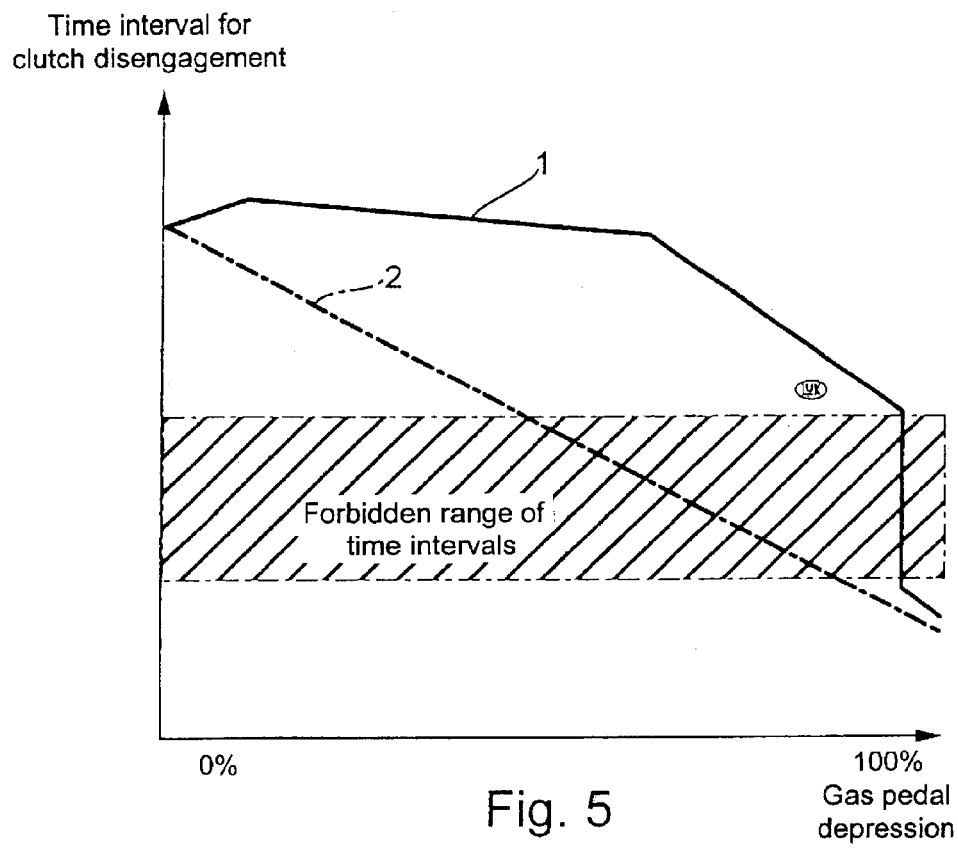
FIG. 5 illustrates an example of a forbidden range of a shift parameter.

The graph of FIG. 5 represents the shift parameter "time interval for clutch disengagement" as a function of the driving parameter "gas pedal depression".

The shaded area in FIG. 5, labeled "forbidden range of time intervals" illustrates a concept of the invention to exclude parameter values that lie in a forbidden range.

The concept of a forbidden range of time intervals takes into account that the power train of a vehicle is a dynamic system capable of oscillating at certain resonance frequencies. Some of the shift parameters such as, e.g., the speed of cutting back the engine torque or the speed of taking the clutch out of engagement, are critical factors that can cause resonance oscillations in the power train. In contrast, dynamic changes of power train variables that lie outside of the forbidden ranges will not cause resonance oscillations and thus keep the gear-changing process comfortably free of damaging resonance effects. FIG. 5 shows furthermore that the forbidden range of time intervals is independent of driving parameter values. Therefore, the forbidden range is simply excluded from the range of shift parameters that the transmission controller can prescribe. To illustrate the concept of excluding shift parameters in the forbidden range, FIG. 5 shows a characteristic curve 1 that jumps over the forbidden range, in contrast to the curve 2 that runs through the forbidden range without a break of continuity. In determining the current shift parameter according to the curve 1, the controller program takes the forbidden range of time intervals into account and excludes shift parameters in the forbidden range.

The invention further proposes the concept of harmonizing the shift parameters used for initiating the shift process with the different shift parameters that are used for concluding the shift process in such a manner that the initial phase and the end phase of the shift process are consistent with each other.

Figure 6:
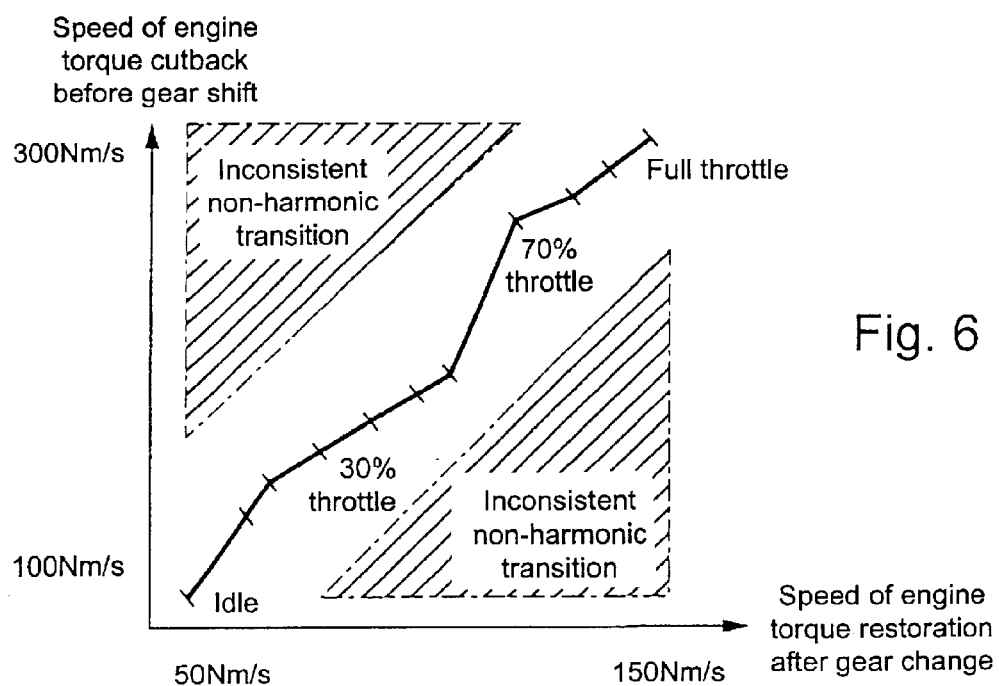
FIG. 6 illustrates an example of shift parameters in a consistent shift process.

This feature of the invention is illustrated in FIG. 6 where the shift parameter "speed of engine-torque cutback before the gear shift" is correlated with the shift parameter "speed of engine-torque restoration after the gear shift".

Each of the two last mentioned shift parameters can be stored in a memory of the transmission controller as a function of a driving parameter, for example as a function of the amount of gas pedal depression. The shaded areas in the diagram of FIG. 6 indicate ranges of parameter values that would lead to inconsistent or non-harmonious transition phases in a gear shifting process. As can be seen in the diagram, if the ratio between the respective speeds at which the engine torque is cut back and subsequently restored is substantially different from about 2:1, the driver will find the shift process to be non-harmonious or inconsistent. Consequently, in a harmonious or consistent gear shift process, the engine torque is decreased before the gear shift about twice as fast as it is increased again after the gear shift.

As an example, a gear shift process with an engine-torque cutback at 150 Nm/sec followed by an engine torque restoration at 80 Nm/sec has been found comfortable.

In a gear change that will provide the driver with a more sport-oriented shift experience, the engine torque is cut back at a rate of e.g. 310 Nm/sec and restored at a rate of 170 Nm/sec. As an example of a gear shift between the comfortable and the sport-oriented style of shifting, the engine torque may be cut back at 220 Nm/sec and before the shift and restored at 120 Nm/sec after the shift.

With a shift characteristic according to a point in the upper shaded triangle of FIG. 6, the driver would experience a sporty first phase of the shift (when the engine torque is cut back) combined with an inconsistently gentle restoration of the engine torque in the end phase of the shift process. A combination of a sporty cut back of the engine torque with a gentle restoration of the torque would give the driver a non-harmonious or inconsistent shifting experience. The invention therefore proposes the concept that the respective shift parameters for the initial phase and the ending phase of the shift process are determined in connection with each other, so that the result is a harmonious shift process that is consistent within itself.

The field of parameter values where a gear shift process is experienced as harmonious in relation to the amount of gas pedal depression is inside the non-shaded area between the two shaded triangles in FIG. 6.

Figure 7:
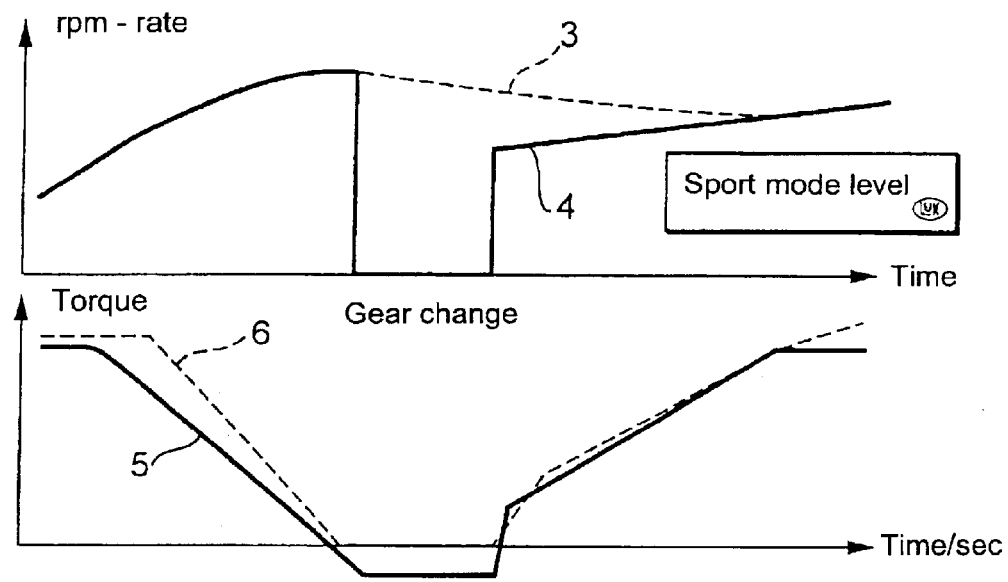
FIG. 7 illustrates an example of shift parameters in a comfort-oriented shift process.
Figure 8:
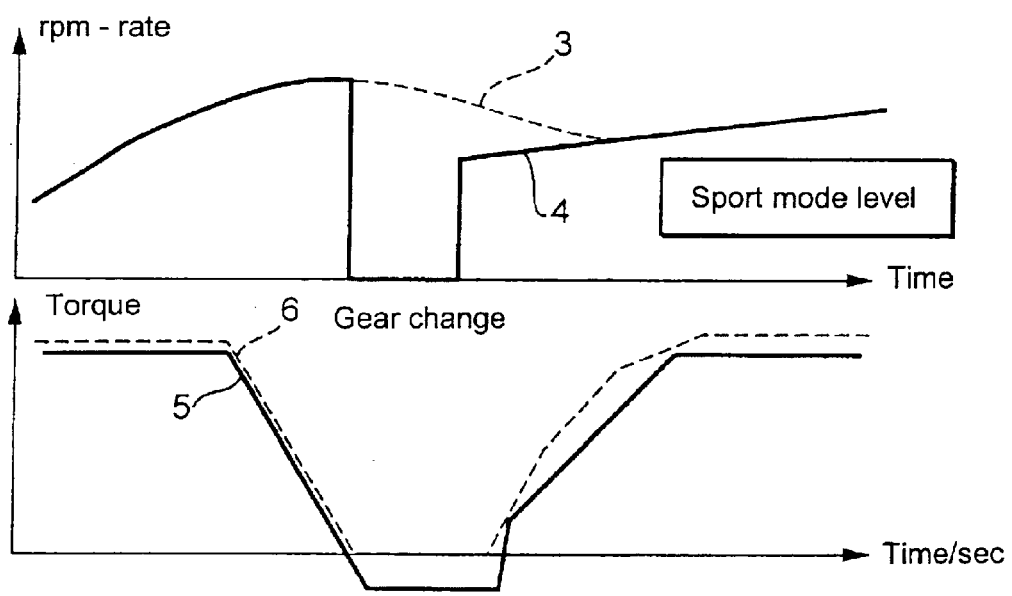
FIG. 8 illustrates an example of shift parameters in a sport-oriented shift process.

FIGS. 7 and 8 represent a further comparison between a comfort-oriented shift process and a sporty type of shift process.

The graphs of FIG. 7 represent, respectively, a gear shift process with the engine rpm-rate 3 and the transmission input rpm-rate 4 as a function of time, and the effective engine torque 5 and the transmittable clutch torque 6 likewise plotted as a function of time, at a sport mode level of 0%.

The graphs of FIG. 8 analogously represent the aforementioned parameters for a sport mode level of 100%. As can be seen directly by comparing the FIGS. 7 and 8, the time interval for changing gears is longer at a sport mode level of 0% than it is for a sport mode level of 100%. In addition, at a sport mode level of 100%, the engine torque is cut back faster before the gear change and also restored faster after the gear change than would be the case at a sport mode level of 0%.

The shift parameters at any intermediate sport mode level between 0% and a 100% can be determined by interpolation between the respective parameters for 0% and 100%. The interpolation allows the shift parameters to be determined as a function of the current driving parameters at the time when the shift parameter values are needed to perform the gear shift. This eliminates the need to determine and store arrays of look-up data during the design process of the transmission controller.

What is claimed is:

1. A method of changing a comfort level of a gear shift in a motor vehicle with an automated gear-shifting transmission, an engine and a clutch, wherein said comfort level is characterized by shift parameters which are dependent on driving parameters characterizing a driving situation of the vehicle and are further dependent on a shift program mode that is identified through a characteristic parameter, said shift program mode being one of a driver-selected and an automatically determined shift program mode, wherein a range of characteristic parameter values correlates to a range of shift program modes; the method comprising:

detecting current values of the driving parameters;

detecting a current value of the characteristic parameter;

determining respective minimum and maximum values that can be assumed by each of said shift parameters as a function of the current driving parameter values dependent on the characteristic parameter value;

calculating actual shift parameter values as intermediate values between said maximum and minimum values for each of said shift parameters based on said current value of the characteristic parameter; and performing the gear shift with the actual shift parameter values.

2. The method of claim 1, wherein the intermediate values are calculated by interpolation between the minimum and maximum values.

3. The method of claim 1, wherein in calculating the actual shift parameter values, said calculation excludes shift parameter values that would cause an oscillatory shaking of the vehicle during the gear shift.

4. The method of claim 1, wherein the shift parameters comprise first shift parameters used in an initial phase of the gear shift and second shift parameters used in an ending phase of the gear shift, and wherein the step of calculating the actual shift parameters is performed in a manner where the first shift parameters and the second shift parameters are in such a relationship to each other that the gear shift is consistent within itself.

5. The method of claim 1, wherein the driving situation of the vehicle includes a current behavior of the driver.

6. The method of claim 1, wherein the shift parameters comprise at least one of the group consisting of:

a rate of engine-torque cutback before changing gears in the automated gear-shifting transmission;

a speed of disengaging the clutch before said changing of gears;

a speed of shift actuation during said changing of gears;

a force of shift actuation during said changing of gears;

a speed of re-engaging the clutch after said changing of gears; and a rate of engine-torque restoration after said changing of gears.

7. An apparatus for performing the method of claim 1, comprising a processor unit operable to evaluate the current driving parameter values and a currently effective shift program mode, to look up in a memory device said maximum and minimum values, and to calculate said actual shift parameters.

8. The apparatus of claim 7, wherein based on said actual shift parameters, the apparatus controls at least one of the clutch and the transmission in performing at least one of disengaging the clutch, shifting out of a currently engaged gear in the transmission, shifting into a different gear in the transmission, and re-engaging the clutch.

9. The apparatus of claim 7, further comprising a device for detecting and evaluating error situations with an error counter operable to increment an error count dependent on the current driving parameter values and, when a predetermined error count limit has been exceeded, to take action through at least one of putting out an error message and interrupting an engagement of the clutch until the error counter has been reset based on the current driving parameter values.

10. A method of changing a comfort level of a gear shift in a motor vehicle with an automated gear-shifting transmission, an engine and a clutch, wherein said comfort level is characterized by shift parameters which are dependent on driving parameters characterizing a driving situation of the vehicle and are further dependent on a shift program mode, said shift program mode being one of a driver-selected and an automatically determined shift program mode, and which are further dependent on a characteristic parameter that is a function of the driving parameters; the method comprising:

detecting current values of the driving parameters;

determining a current characteristic parameter value based on the current values of said driving parameters;

determining respective minimum and maximum values that can be assumed by each of said shift parameters as a function of the current driving parameter values dependent on the characteristic parameter value;

calculating actual shift parameter values as intermediate values between said maximum and minimum values; and performing the gear shift with the actual shift parameter values.

11. The method of claim 10, wherein the intermediate values are calculated by interpolation between the minimum and maximum values.

12. The method of claim 10, wherein in calculating the actual shift parameter values, said calculation excludes shift parameter values that would cause an oscillatory shaking of the vehicle during the gear shift.

13. The method of claim 10, wherein the shift parameters comprise first shift parameters used in an initial phase of the gear shift and second shift parameters used in an ending phase of the gear shift, and wherein the step of calculating the actual shift parameters is performed in a manner where the first shift parameters and the second shift parameters are in such a relationship to each other that the gear shift is consistent within itself.

14. The method of claim 10, wherein the driving situation of the vehicle includes a current behavior of the driver.

15. The method of claim 10, wherein the shift parameters comprise at least one of the group consisting of:

a rate of engine-torque cutback before changing gears in the automated gear-shifting transmission;

a speed of disengaging the clutch before said changing of gears;

a speed of shift actuation during said changing of gears;

a force of shift actuation during said changing of gears;

a speed of re-engaging the clutch after said changing of gears; and a rate of engine-torque restoration after said changing of gears.

16. An apparatus for performing the method of claim 10, comprising a processor unit operable to evaluate the current driving parameter values and a currently effective shift program mode, to look up in a memory device said maximum and minimum values, and to calculate said actual shift parameters.

17. The apparatus of claim 16, wherein based on said actual shift parameters, the apparatus controls at least one of the clutch and the transmission in performing at least one of disengaging the clutch, shifting out of a currently engaged gear in the transmission, shifting into a different gear in the transmission, and re-engaging the clutch.

18. The apparatus of claim 16, further comprising a device for detecting and evaluating error situations with an error counter operable to increment an error count dependent on the current driving parameter values and, when a predetermined error count limit has been exceeded, to take action through at least one of putting out an error message and interrupting an engagement of the clutch until the error counter has been reset based on the current driving parameter values.

* * * * *